United States Patent Office 3,468,917
Patented Sept. 23, 1969

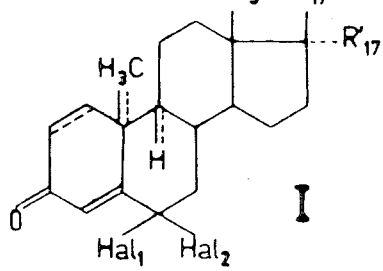
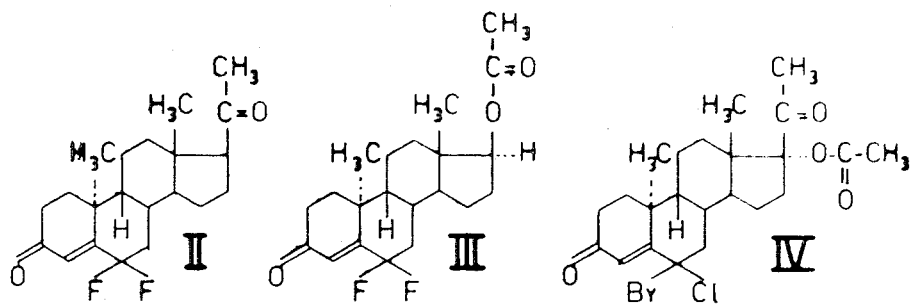
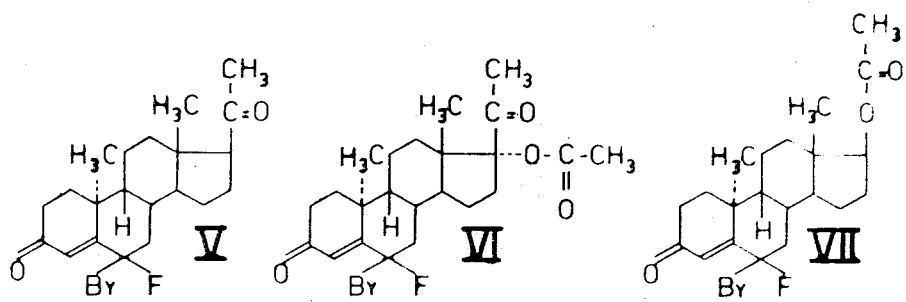
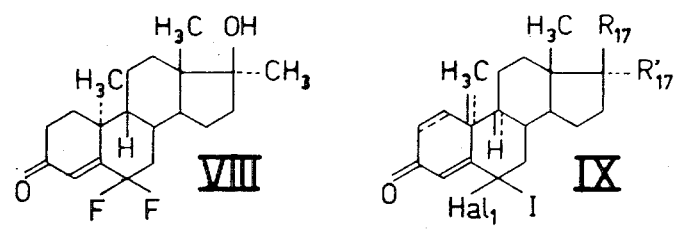

3,468,917
NOVEL 6,6-DIHALO-9β, 10α-STEROIDS
Pieter Westerhof and Hendrik Frederik Louis Scholer, Van Houtenlaan, Weesp, Netherlands, assignors, by mesne assignments, to U.S. Philips Corporation, New York, N.Y., a corporation of Delaware
Filed June 27, 1966, Ser. No. 560,484
Claims priority, application Great Britain, June 30, 1965, 27,735/65
Int. Cl. C07c *169/66, 169/30;* A61k *27/00*
U.S. Cl. 260—397.3                     15 Claims

ABSTRACT OF THE DISCLOSURE

Novel 6,6-dihalo-9β, 10α steroids of the androstane and pregnane series such as 6-bromo-6-chloro-17α-hydroxy-9β,10α-pregn-4-en-3,20-dione 17-acetate and 6-bromo-6-fluoro-17β-hydroxy-9β,10α-androst-4-en-3-one 17-acetate. These compounds have hormonal activities.

---

This invention relates to steroid compounds, and is concerned with a new class of such compounds and methods of producing the same, and with processes using such compounds as starting materials or intermediates for the production of further compounds. In the ensuing description, reference is made to the accompanying drawings wherein are set out certain structural chemical formulae, serially numbered for identification.

The invention comprises a class of new steroid compounds, being compounds of Formula I shown in the accompanying drawings, in which formula $R_{17}$ represents a —CO—$CH_3$ group, in which case $R'_{17}$ represents hydrogen or an esterified, etherified, or free hydroxy group, or $R_{17}$ represents an esterified, etherified or free hydroxy group in which case $R'_{17}$ represents hydrogen or a lower alkyl, alkenyl or alkynyl group containing from 1–6 carbon atoms, $Hal_1$ represents a fluorine, chlorine or bromine atom and $Hal_2$ represents a fluorine, chlorine or bromine atom, and in which formula a double bond may be present between the carbon atoms 1 and 2.

The invention comprehends compounds of the aforesaid formula as defined, both of the so-called normal series of steroids, and of the 9β, 10α series. This, and the optional presence of a $\Delta^1$ double bond, are denoted in the formula by the presence of both solid and dash-lines representing the 1–2 and the 18–10 bonds, and the bond connecting the hydrogen atom at the 9-position to the nucleus.

The configuration at the asymmetric carbon atoms 8, 9, 10, 13 and 14 may be either the same as in normal steroids or the same as in 9β, 10α-steroids. These configurations are 8β, 9α, 10β, 13β, 14α and 8β, 9β, 10α, 13β, 14α, respectively. Hereinafter, steroids showing the latter configuration will be denoted 9β, 10α-steroids, whereas the other so-called normal, steroids will be indicated without the use of any such prefix. The notation "(9β, 10α)" is used to indicate that members of both series are meant.

Particularly interesting compounds are those compounds of Formula I in which $Hal_1$ and $Hal_2$ each represents a fluorine atom.

The invention includes methods of preparing the aforesaid compounds of Formula I, as will be further described below, and also pharmaceutical preparations comprising the same and methods of manufacturing such preparations comprising mixing the same with, or dissolving or dispersing in, a solid or liquid pharmaceutical carrier, if desired together with other ingredients.

An esterified hydroxy group represented by $R_{17}$ or $R'_{17}$ in the above formula may be an acyloxy group containing from one to twenty carbon atoms. The acyl part of the acyloxy group is preferably the acyl group of a saturated or unsaturated aliphatic mono-, di- or tricarboxylic acid, a mixed aliphatic-aromatic carboxylic acid, an aromatic carboxylic acid, or a saturated or unsaturated alicyclic- or mixed aliphatic-alicyclic monocarboxylic acid, especially those having from 1–6 carbon atoms. Examples of suitable acyloxy groups are: formoxy-, acetoxy-, propionoxy-, or butyroxy-; acyloxy groups derived from oleic acid, palmitic acid, stearic acid, enanthic acid, undecanoic acid, caproic acid, pivalic acid, succinic acid, malonic acid, citric acid; or from benzoic acid or p-hexyloxy-phenylpropionic acid, hexahydrobenzoic acid, phenylacetic acid, β-cyclopentylpropionic acid, or β-cyclohexylpropionic acid.

An etherified hydroxy group represented by $R_{17}$ or $R'_{17}$ may be an alkoxy group containing from one to ten carbon atoms. The alkyl part of the alkoxy group is preferably an aliphatic, alicyclic, mixed aliphatic-aromatic or mixed aliphatic-alicyclic group. Examples of suitable alkoxy groups are: methoxy-, ethoxy-, propoxy-, tert-, butoxy-, cyclopentyloxy-, cyclohexyloxy and benzyloxy, or methyl cyclopentyloxy groups.

The compounds according to the invention show surprising pharmacological properties, in particular in influencing, the normal balance of hormonal activities.

Thus, 6,6-difluoro-9β, 10α-pregn-4-en-3,20-dione (Formula II) shows ovulation inhibiting activities and 6,6-difluoro-17β-hydroxy-9β, 10α-androst-4-en-3-one 17-acetate (Formula III) has anabolic and gonadotrophine-inhibiting properties in particular with males.

Other interesting compounds within the scope of the invention include:

6-bromo-6-chloro-17α-hydroxy-9β,10α-pregn-4-en-3,20-dione 17-acetate (Formula IV)

6-bromo-6-fluoro-9β,10α-pregn-4-en-3,20-dione (Formula V)

6-bromo-6-fluoro-17α-hydroxy-9β,10α-pregn-4-en-3,20-dione 17-acetate (Formula VI)

6-bromo-6-fluoro-17β-hydroxy-9β,10α-androst-4-en-3-one 17-acetate (Formula VII)

6,6-difluoro-17β-hydroxy-17-methyl-9β,10α-androst-4-en-3-one (Formula VIII)

The compounds according to the invention may be worked up to pharmaceutical or veterinarian preparations in the usual way. Thus injection liquids may be produced by dissolving a methylene chloride solution of an active compound in arachid oil and by evaporating methylene-chloride subsequently. Suppositoria may be produced by mixing intimately an active compound with an ester of a higher aliphatic alcohol and a higher aliphatic carboxylic acid, for example carbowaxes, or with cacaobutter or with a mixture of gelatine and glycerol. Further the inventive compounds may be worked up into tablets using the usual fillers such as starch or binders or lubricants for example magnesium stearate, carboxy methylcellulose and the like.

The compounds according to the invention may for example be prepared by one of the following methods.

(1) A 3-keto-4-dehydro-6-fluoro- or -6-bromo- or -6-chloro- (9β,10α)-steroid may be brominated or chlorinated in allylic position with respect to the double bond with a suitable halogenating agent, such as for example elemental chlorine or bromine, N-bromo- or N-chloro-succinimide, N-dibromo- or N-dichloro-dimethylhydantoin, N-dichloro- or N-dibromo-benzenesulphonamide, or pyridine perbromide or pyridine perchloride.

(2) A 3,5-bisdehydro-3-enolether of a 3-keto-4-dehydro-6-fluoro (or -6-bromo- or -6-chloro-)-(9β,10α)-steroid may be reacted with a chlorinating or brominating agent as mentioned under (1) above or with perchloryl fluoride.

Methods of producing the said starting materials have been described in the literature. The halogenating methods described under (1) and (2) above are methods known per se and are elaborately described in the literature. In general, any hydroxyl group present is preferably in the protected form, for example as an etherified or as an esterified hydroxyl group, when carrying out the halogenation reaction.

According to the methods as indicated under (1) and (2) above the second halogen atom is introduced at carbon atom 6.

When method (2) is applied the 3,5-bisdehydro-3-enol-ether grouping is converted, simultaneously with the introduction of the second halogen atom, into a 3-keto-4-dehydro grouping.

The invention further comprises a method of producing 3-keto-4,6-bisdehydro-6-fluoro (or 6-bromo- or 6-chloro)-(9β,10α)-steroids in which method 3-keto-4-dehydro-6,6-dihalogeno-(9β,10α)-steroids are used as intermediate or as starting materials. In the said 3-keto-4-dehydro-6,6-dihalogeno-(9β,10α)-steroids one halogen atom is taken from the group consisting of fluorine, chlorine and bromine and the other halogen atom is taken from the group consisting of chlorine, bromine and iodine.

3-keto-4,6-bisdehydro-6-halo-(9β,10α)-steroids have interesting pharmacological properties such as progestational or anabolic/androgenic activities. Hitherto, it has been proposed to prepare these compounds by treatment of a 3-keto-4-dehydro-6-fluoro-(9β,10α)-steroid with 2,3-dichloro-5,6-dicyanobenzoquinone or by oxidizing an enolether of a 3-keto-4-dehydro-6-halogeno-(-fluoro, chloro or bromo)-(9β,10α)-steroid with $MnO_2$.

Although these methods result to a certain extent in acceptable yields of the desired products a need for further improvement in this respect has been evident, and may be achieved by the process according to this aspect of the present invention, as devised above, using the 3-keto-4-dehydro-6,6-dihalogeno-(9β,10α)-steroids as defined on the former page as starting materials or as intermediates.

In its simplest form this inventive process consists in dehydrohalogenating the 3-keto-4-dehydro-6,6-dihalogeno-(9β,10α)-steroid as defined on the former page to produce the corresponding 3-keto-4-6,6-bisdehydro-6-halogeno-(9β,10α)-steroid. The dehydrohalogenation step may be carried out in the conventional manner e.g. by using an organic amine, for example a tertiary amine such as pyridine, collidine, dimethylaniline or diethylaniline. It is also possible to use finely powdered calcium oxide or lithium halide, for example LiCl or LiBr in dimethylformamide, alone or if desired in the presence of lithium carbonate.

This method provides good yields of the desired 3-keto-4,6-bisdehydro-6-halogeno-(6-fluoro-, chloro- or bromo)-(9β,10α)-steroids.

Special advantages of this method become apparent when it is combined with a process of preparing the starting material of the aforesaid method. Such starting materials (3-keto-4-dehydro-6,6-dihalogeno-(9β,10α)-steroids) may be prepared by enoletherification as position 3 of a 3-keto-4-dehydro-6-fluoro (or 6-chloro- or 6-bromo)-(9β,10α)-steroid followed by halogenation (fluorination, chlorination, bromination, iodination). Thus in a more specific form the invention comprises a method of producing 3-keto-4,6-bisdehydro-6-halogeno-(fluoro-, chloro- or bromo-)-(9β,10α)-steroid comprising the steps of enoletherification at carbon atom 3 of a 3-keto-4-dehydro-6-halogeno (fluoro-, chloro- or bromo)-(9β,10α)-steroid followed by halogenating (chlorinating, brominating or iodinating) the thus produced 3-enolether-3,5-bisdehydro-6-halogeno-(9β,10α)-steroid to produce a 3-keto-4-dehydro-6,6-dihalogeno-(9β,10α)-steroid and followed finally by dehydrohalogenating the 6,6-dihalogeno-(9β,10α)-steroid.

This process gives relatively high yields of 3-keto-4,6-bisdehydro-6-halogeno (fluoro-, chloro- or bromo-)-(9β,10α)-steroids as calculated on the basis of 3-keto-4-dehydro-6-halogeno-(fluoro-, chloro- or bromo)-(9β,10α)-steroids as starting materials, in particular when the halogen atom of the starting material is a fluorine atom.

One of the advantages of this 3-step process is that it may be carried out without working up the intermediately formed products. Thus the halogenation can be carried out by the addition of the halogenating agent to the reaction mixture of the enoletherification reaction; and the dehydrohalogenation reaction may be carried out in the thus resulting reaction mixture.

Enoletherification may conveniently be carried out with an orthoformate ester in the presence of a catalyst, e.g. with ethylorthoformate and hydrochloric acid or with ethylorthoformate and p-toluene sulphonic acid.

Halogenation may be effected by means of one of the fluorinating, chlorinating, brominating or iodinating methods described above. Introduction of an iodine atom at carbon atom 6 may be carried out with N-iodo succinimide or with N-iodo-benzenesulphonamide, giving a compound of Formula IX.

The dehydrohalogenation reaction may take place in the usual manner e.g. with an organic tertiary amine such as collidine, pyridine, dimethyl- or diethylaniline. It is also possible to use finely powdered calcium oxide, or lithium halide e.g. LiCl or LiBr, in dimethyl formamide. In general this latter method gives somewhat higher yields than the one in which an organic base is used, with or without lithium carbonate also present.

By way of illustration, certain preferred processes embodying the invention will now be described in more detail in the ensuing specific examples. In the examples, unless otherwise specified parts or percentages are weight-for-weight, and temperatures are in degrees centigrade.

The method according to the invention is in particular of advantage for the production of 3-keto-4,6-bisdehydro-6-fluoro-(9β,10α)-steroids.

In case both 6-halogen atoms are different from each other, it should be born in mind that HI is more easily split off than HBr, which latter molecule is more easily removed than HCl. Under conventional conditions for dehydro halogenation the 6-fluorine atom is not split off, when the other 6-halogeno atom is either chlorine, bromine or iodine from the 6,6-dihalogeno steroids under consideration.

Example 1

A solution of 1.8 gms. of 6β-bromo-9β,10α-pregn-4-en-3,20-dione and 50 mgms. of p-toluenesulphonic acid in a mixture of 5 ml. of methylene chloride, 20 ml. of purified dry dioxan and 1.2 ml. of freshly distilled ethylorthoformate, was allowed to stand at room temperature for 20 hours. After dilution with 300 ml. of petroleum ether and addition of 1 ml. of dry pyridine, the reaction mixture was filtered through a column of 20 gms. of silica gel. Elution was completed with 200 ml. of a mixture of benzene and petroleum ether (1:3). The filtration procedure was repeated through another 20 mgs. of silica gel. After evaporating off the solvents in vacuo, a yield of 0.8 gm. of oily 3-ethoxy-6-bromo-9β,10α-pregna-3,5-dien-20-one was obtained.

The 3-enolether was dissolved in 30 ml. of acetone at 0° C. and was then brominated by the successive addition with stirring at 0° C. of a solution of 0.34 gm. of sodium acetate in 3.4 ml. of water, 0.8 gm. of N-bromosuccinimide and 0.3 ml. of acetic acid. Stirring was continued for 30 minutes, and the reaction mixture then worked up by dilution with 200 ml. of ice-water and extraction with methylene chloride. The extract was washed successively with water, a sodium bicarbonate solution, and again with water. Evaporating off the solvents after addition of 0.1 ml. of pyridine gave oily 6,6-dibromo-9β,10α-pregn-4-en-3,20-dione.

The 6,6-dibromo product was dissolved into 2 ml. of dry pyridine and the resulting solution was heated at 90°

C. for 45 minutes. Working up gave 0.8 gm. of a crude product, which was chromatographed through a column of 15 gms. of silica gel. The column was eluted with mixtures of benzene and acetone containing increasing quantities of the latter solvent. From the appropriate fraction 0.4 gm. of impure 6-bromo-9β,10α-pregna-4,6-dien-3,20-dione was obtained. Recrystallization from ethanol yielded 0.25 gm. of the pure compound.

Melting point: 107–108° C. (dec., vac.), ε(λmaximum =292 mμ)=19,000, $[α]_D^{25}$=−321° (CHCl$_3$).

Example 2

1.18 gms. of 6β-bromo-9β,10α-pregn-4-en-3,20-dione were etherified in the same manner as described in Example 1. After the reaction mixture had stood for 24 hours, 30 ml. of acetone were added and the solution obtained was cooled to 0° C. and then brominated with N-bromosuccinimide. The 6,6-dibromo-9β,10α-pregn-4-en - 3,20-dione obtained was dehydrobrominated and worked up also as described in Example 1. By this procedure the yield of 6-bromo-9β,10α-pregna-4,6-dien-3,20-dione was improved to 0.40 gm.

Example 3

6β-bromo-9β,10α-pregn-4-en - 3,20 - dione was etherified as described in the foregoing Example 2. In this experiment, however, the bromination was carried out by means of bromine in equivalent amounts. After dehydrobromination of the 6,6-dibromo-9β,10α-pregn-4-en-3,20-dione and working up, 0.35 gm. of 6-bromo-9β,10α-pregna-4,6-dien-3,20-dione was obtained.

Example 4

To a solution of 0.814 gm. of 6β-chloro-17α-hydroxy-9β,10α-pregn-4-en-3,20-dione 17-acetate in 15 ml. of dry dixan, there were added, whilst stirring, 0.7 ml. of ethyl orthoformate and 28 mgms. of p-toluenesulphonic acid. The solution was allowed to stand at room temperature in the dark for 22 hours. After cooling to 0° C., 20 ml. of cold acetone, a solution of 0.2 gm. of dry sodium acetate in 2 ml. of water, 0.75 gm. of N-bromosuccinimide and 0.2 ml. of acetic acid were added, whilst stirring, to the solution of the 3-enolether in the order given. After stirring for one hour, the reaction mixture was poured out into water and extracted with benzene-ether. The combined extracts were washed with a sodium bicarbonate solution and with water. Drying and evaporation of the solvent in vacuo yielded a brownish resin with an a(1%, 1 cm.)=230 at 236.5 mμ substantially representing 6-bromo-6-chloro-17α-hydroxy-9β,10α - pregn - 4 - en-3,20-dione 17-acetate.

A solution of the said resin product in 5 ml. of pyridine was heated at approximately 95° C. for one hour. Working up in the usual way yielded 0.66 gm. of a residue, which was chromatographed through a column of 12 gm. of silica gel. From the appropriate fraction 0.48 gm. of 6-chloro - 17α - hydroxy - 9β,10α - pregna - 4,6-diene-3, 20-dione 17-acetate was obtained. Recrystallization from ethanol yielded the pure compounds.

Melting point: 150–151° C. (dec.), ε(λmaximum =286 mμ)=20,800, $[α]_D^{25}$=−401° (CHCl$_3$).

Example 5

A solution of 9.2 gms. of 6β-fluoro-9β,10α-pregn-4-en-3,20-dione and 0.37 gm. of p-toluenesulphonic acid in 185 ml. of dry purified dioxan and 9.2 ml. of ethyl orthoformate, was allowed to stand at room temperature in the dark for 24 hours. The reaction mixture was cooled to 0° C. and 300 ml. of acetone at 0° C. were added. The 3-enolether was then brominated by successive addition at 0° C. with stirring, of a solution of 3.4 gm. of sodium acetate in 34 ml. of water, then 8.2 gm. of N-bromosuccinimide, and finally 3 ml. of acetic acid. After stirring at 0° C. for a further 30 minutes, the reaction mixture was worked up by diluting with 2 litres of ice-water and extracting with methylene chloride and petroleum ether. The extract was washed successively with water, a sodium bicarbonate solution and again with water. Evaporation of the solvents after addition of 1 ml. of pyridine gave a residue of 6-bromo-6-fluoro-9β,10α - pregn - 4 - en - 3,20-dione. This residue was dissolved in 10 ml. of pyridine, and resulting solution heated at 90° C. for 45 minutes. Work-up as usual gave 8.1 gms. of a dark brown-coloured resin.

Chromatography through a column of 150 gms. of silica gel gave 4.53 gms. of product from the appropriate fraction. Recrystallization from ethanol at −25° C. yielded 3.70 gms. of 6-fluoro-9β,10α-pregna-4,6-dien-3, 20-dione.

Melting point: 177–178.5° C. ε(λmaximum=285 mμ)=23,600. $[α]_D^{25}$=−263° (CHCl$_3$).

Example 6

To a solution of 10 gms. of a mixture of 6α- and 6β-fluoro-17α-hydroxy-9β,10α-pregn-4-en-3,20-dione 17-acetate in 200 ml. dry purified dioxan were added 10 ml. of ethyl orthoformate and 400 mgms. of p-toluenesulphonic acid. After standing at room temperature for 24 hours, the reaction mixture was cooled to 0° C., and to it were subsequently added 300 ml. of acetone at 0° C., a solution of 3.4 gms. of sodium acetate in 34 ml. of water also cooled to 0° C., 9.2 gms. of powdered N-bromosuccinimide and 3.3 ml. of acetic acid. The reaction mixture was stirred at 0–5° C. for 30 minutes and then worked up. The 6-bromo-6-fluoro-17α-hydroxy-9β,10α-pregn-4-en-3,20-dione 17-acetate product was dehydrohalogenated in approximately 30 ml. of pyridine by heating at 90° C. for one hour. Working up as usual gave 9.26 gms. of a residue with an a(1%, 1 cm.)=438 at 284 mμ. Chromatography through a column of 150 gms. of silica gel gave after recrystallization of the appropriate fractions 4.8 gms. of 6-fluoro-17α-hydroxy-9β,10α-pregna-4,6-diene-3,20-dione 17-acetate.

Melting point: 182.5–184.5° C. ε(λ maximum=285 mμ)=24,000.

Example 7

Using the same procedure as described in Example 6, 1 gm. of a mixture of 6α- and 6β-fluoro-17α-hydroxy-9β,-10α-pregn-4-en-3,20-dione 17-acetate was enoletherified. After the addition of acetone at 0° C., halogenation was carried out with an equivalent amount of N-iodo-succinimide. Work-up, dehydroiodination of the 6-iodo-6-fluoro-17α-hydroxy-9β,10α-pregn-4-en-3,20-dione 17-acetate with collidine, and again working up as described in Example 6, finally gave 0.45 gm. of 6-fluoro-17α-hydroxy-9β,10α-pregna-4,6-dien-3,20-dione 17-acetate.

Example 8

3 gms. of 6β-fluoro-17β-hydroxy-9β,10β-androst-4-en-3-one 17-acetate were dissolved into a solution of 120 mgms. of p-toluenesulphonic acid in a mixture of 60 ml. of dry purified dioxan and 3 ml. of freshly distilled ethyl orthoformate. The reaction mixture was kept at approximately 15° C. in the dark for 20 hours, after which it was cooled to 0° C. after the addition of 90 ml. of acetone. Then while stirring 1 g. of sodium acetate in 10 ml. of water, 3 gms. of finely powdered N-bromosuccinimide and 1 ml. of acetic acid were quickly added, in the sequence given, to the solution of the 3-enolether. Stirring was continued at 0° C. for 45 minutes. Thin-layer chromatography of samples of the reaction mixture at different times of reaction indicated that in about a quarter of an hour the greatest part of the ether had already been converted into the brominated product. After working up 10 ml. of pyridine were added to the residue of 6-bromo-6-fluoro-17β-hydroxy-9β,10α-androst-4-en-3-one 17-acetate and the solution was heated at approximately 90° C. for about one hour.

The residue (2.41 gms.) obtained was combined with that obtained from another identical experiment starting with 5 gms. of 6β-fluoro-17β-hydroxy-9β,10α-androst-4-en-3-one 17-acetate. The combined residues were dissolved in 2 litres of a mixture of benzene-petroleum ether (1:1). This solution was chromatographed through a column of 280 gms. of silica gel. Elution and recrystallization of the appropriate fractions yielded 4.02 gms. of 6-fluoro-17β-hydroxy-9β,10α-androsta-4,6-dien-3-one 17-acetate.

Melting point: 156–158° C. ε(λmaximum=285 mμ)=23,400.

Example 9

1 gm. of 6β-fluoro-17β-hydroxy-9β,10α-androst-4-en-3-one 17-acetate was enoletherified as described in Example 8, and the product worked up as described in Example 1 yielding 0.75 gm. of crude enolether.

To a solution of this enolether fraction in 15 ml. of ether at 0° C. a solution was added of 1.6 gm. of potassium acetate in 30 ml. of 85% aqueous acetic acid. Bromination was carried out by adding with stirring, a solution of 320 mgms. of bromine in 10 ml. of acetic acid in the course of 5 minutes. After stirring for another 5 minutes the reaction mixture was worked up. The product, 6-bromo-6-fluoro-17β-hydroxy-9β,10α-androst-4-en-3-one 17-acetate, was dissolved into 10 ml. of pyridine and the solution was heated at 90° C. for 50 minutes. Working up yields 510 mgms. of a residue. Purification by chromatgraphy through a column of silica gel and recrystallization from ethanol at −25° C. finally yielded 6-fluoro-17β-hydroxy-9β,10α-androsta-4,6-dien-3-one 17-acetate with a melting point of 151.5–152.5° C. and an a(1%, 1 cm.)=675 at 284 mμ.

Example 10

To a solution of 4 gm. of 6α-fluoro-9β,10α-pregn-4-en-3,20-dione in 80 ml. of dry, purified dioxan were added 4 ml. of freshly distilled ethyl orthoformate and 160 mgms. of p-toluenesulphonic acid. After standing at room temperature for 24 hours, the reaction mixture was worked up as described in Example 1, yielding the 3-enolether in a nearly quantitative yield. The non-crystalline residue was dissolved into 100 ml. of acetone, after which 1.25 gms. of potassium acetate and 55 ml. of dry ethanol were added to the solution. While stirring vigorously, perchloryl fluoride was introduced into the solution at +10° C. for 2 hours. Working up yielded 3.72 gms. of a resin, which was chromatographed through a column of 120 gms. of silica gel using benzene-acetone as the solvents. From this a fraction of 1.43 gms. of 6,6-difluoro compound was obtained, which after recrystallization from acetone-hexane yielded 0.8 gm. of 6,6-difluoro-9β,10α-pregn-4-en-3,20-dione.

Melting point: 155–156° C. (vacuo). ε(λmaximum=229 mμ)=12,100.

Example 11

6α-fluoro-17β-hydroxy-9β,10α-androst-4-en-3-one 17-acetate (8.65 gms.) was etherified as described in Example 10. The crude enolether was treated with perchloryl fluoride and the reaction mixture worked up. After chromatography and recrystallization from acetone-hexane at 0° C., 2.17 gms. of 6,6-difluoro-17β-hydroxy-9β,10α-androst-4-en-3-one 17-acetate were obtained.

Melting point: 189.5–191° C. ε(λmaximum=229 mμ=11,900. [α]$_D^{25}$=−55° (CHCl$_3$).

Infrared absorption bands at: 1742, 1690, 1630, 1420, 1255, 1125, 1045, 1030 and 886 cm.$^{-1}$.

M.M.R.-spectrum: 0.85/s. (3)CH$_3$-18; 1.43/d/J=1 Hz. (3)CH$_3$-19; 2.05/s. (3)17β-OAc; 4.73/m. (1)CH-17; 6.26/d/J=3.5 Hz. (1)CH-4.

Example 12

9β,10α-androst-4-en-3,17-dione was converted into the 3-pyrrolidino-3,5-dienamine by refluxing in methanol in the presence of pyrrolidine. The crystalline enamine (melting point 123–125° C.) was then reacted with methyl magnesium bromide in tetra-hydrofuran (or ether). After hydrolysis with aqueous methanolic potassium hydroxide at 45° C. for one hour the reaction mixture was worked up to give 17β - hydroxy - 17 - methyl-9β,10α-androst-4-en-3-one with a melting point of 133–134° C. The latter compound was reacted with isopropenylacetate in benzene in the presence of p-toluenesulphonic acid by refluxing for 4 hours. Work-up and recrystallization yielded 17α - methyl-9β,10α-androsta-3,5-dien-3,17-diol 3,17-diacetate with a melting point of 128–130° C. This diacetate was chlorinated in a medium of ether-aqueous acetic acid with chlorine in the presence of sodium acetate at −5° C. Working up yielded crystalline 6β-chloro - 17β - hydroxy - 17-methyl-9β,10α-androst-4-en-3-one 17-acetate with a melting point of 168–170° C.

This compound was enoletherified as described in Example 4, and the resulting 3-enolether was bromated without intermediate working up, as described in that example. The resulting 6-bromo-6-chloro-17β-hydroxy-17-methyl-9β,10α-androst-4-en-3-one 17-acetate was dehydrobrominated with pyridine at 95° C. for 45 minutes to yield, after working up and recrystallization, 6-chloro-17β - hydroxy - 17-methyl-9β,10α-androsta-4,6-dien-3-one 17-acetate with a melting point of 152–153° C.

Example 13

17α - methyl-9β,10α-androsta-3,5-dien-3,17-diol 3,17-diacetate was fluorinated in acetone-ethanol with perchloryl fluoride in the presence of anhydrous sodium acetate at 0° C. until no more starting material proved to be present (as determined by thin-layer chromatography). Working up yielded a mixture of 6α- and 6β-fluoro-17β-hydroxy - 17 - methyl - 9β,10α-androst-4-en-3-one 17-acetate. This mixture was enoletherified as described in Example 6. Working up as described in Example 1 gave the oily 3-enolether, which was fluorinated as described in Example 10. Working up, chromatography and recrystallization from acetone-hexane finally yielded 6,6-difluoro-17β - hydroxy - 17 - methyl-9β,10α-androst-4-en-3-one 17-acetate with ε(λmaximum=229 mμ)=12,000.

Hydrolysis of the 17-acetoxy to the 17-hydroxy group can conveniently be carried out by reduction with lithium aluminium hydride in tetrahydrofuran subsequently followed by selective reoxidation of the 3-hydroxy group with 2,3-dichloro-5,6-dicyanobenzoquinone in order to restore the 3-keto-4-dehydro system.

Example 14

17α-acetoxyprogesterone was 3-enolesterified by reaction with isopropenyl acetate in benzene in the presence of p-toluene-sulphonic acid by refluxing for 4 hours. The diester product, 3,17α-dihydroxy-pregna-3,5-dien-20-one 3,17-diacetate, was chlorinated in ether-aqueous acetic acid with chlorine in the presence of sodium acetate at −5° C. After working up, a mixture of 6α- and 6β-chloro-17α-acetoxyprogesterone was obtained, which, without intermediate purification, was enoletherified and subsequently brominated as described in Example 4 to yield the crude 6 - bromo - 6 - chloro-17α-acetoxyprogesterone. Dehydrobromination by heating of the dihalo-product in pyridine at 95° C. for 40 minutes gave, after working up and purification, 6-chloro-6-dehydro-17α-acetoxy-progesterone with a melting point of 208–210° C. and ε(λmaximum =285 mμ)=22,500.

Example 15

6α-fluoro-testosterone 17-propionate (or the corresponding 6β-fluoro compound or a mixture of 6α- and 6β-fluoro compounds) (A. Bowers and H. J. Ringold, Tetrahedron 3, 14 (1958)) was enoletherified and subsequently brominated as described in Example 5. The crude 6-bromo-6-fluoro-testosterone 17-propionate was dehydrobrominated by heating in 20 ml. of pyridine at 95° C. for one hour. Working up and purification gave 5.9 gms. of 6-fluoro-6-dehydrotestosterone 17-propionate with a melting point of 122–124° C. and an ε(λmaximum=284 mμ)=23,700.

Example 16

By the method described in Example 15, 6-fluoro-17α-acetoxy-progesterone (5 gms.) (A. Bowers et al., J. Am. Chem. Soc. 81, 5991 (1959)) was enoletherified, brominated and dehydrobrominated to yield 2.97 gms. of 6-fluoro-6-dehydro-17α-acetoxy progesterone with a melting point of 227–230° C. and ε(λmaximum=284 mμ)=24,000.

Whereas certain preferred processes and methods of practising the invention have been described in the foregoing specific examples, it will be understood that modifications may be made in the procedures described, within the scope of the invention, as will be apparent to those skilled in the art, whether in producing the same compounds or other compounds of Formula I as herein defined. In particular, etherification or esterification of a free hydroxyl group represented by $R_{17}$ or $R'_{17}$, or saponification or de-etherification of such hydroxy group so protected, may be effected in known manner at a convenient point in the reaction sequence. Likewise a hydrocarbon radical represent by $R'_{17}$ may be present in the starting material or may be introduced at a suitable reaction stage. When desired, a 1-dehydro double bond may be introduced into the steroid nucleous in known manner at a suitable stage.

Example 17

6α-fluoro - 17β - hydroxy - 9β,10α - androst-4-en-3-one 17-acetate (15 g.) was enoletherified as given in Example 1. Work-up gave 15.43 g. 3,5 - bisdehydro - 3 - enolether, which was halogenated with N-chlorosuccinimide as described in Example 1. Work-up gave 15.44 g. of an oil, which was carefully chromatographed through a column of 300 g. of silicagel. Rechromatography of the 6-chloro, 6-fluoro fraction through a column of 250 g. of silicagel finally afforded both 6-chloro, 6-fluoro isomers in a pure state after recystallization of the appropriate fractions from ether.

The analytical data of 6α-chloro-6-fluoro-17β-hydroxy-9β,10α-androst-4-en-3-one 17-acetate are the following:

M.P. 145–146° ε(λmaximum=237 mμ)=13,200. $[\alpha]_D^{25}=-32°$ (chloroform).

Those for 6β - chloro-6-fluoro-17β-hydroxy-9β,10α-androst - 4 - en-3-one 17-acetate are: M.P. 150.5–152°. ε(λmaximum=237 mμ)=11,150. $[\alpha]_D^{25}=-86°$ (chloroform).

Example 18

6β-chloro-17β-hydroxy-9β,10α-androst-4-en - 3 - one 17-acetate (5.16 g.) was enoletherified and worked up as described in Example 1. The 3-enolether obtained (5.4 g.) was dissolved into 100 ml. of acetone and to this solution at 0° was added a solution of 2.7 g. of dry potassium acetate in 70 ml. of dry ethanol. Then, with vigorous stirring, a mixture of purified perchloryl fluoride and nitrogen (1+1) was led into the solution at 0°. Work-up after two hours afforded a crude product, which was chromatographed through a column of 110 g. of silicagel. Rechromatography of the appropriate fraction afforded the pure 6α-chloro-6-fluoro-17β-hydroxy-9β,10α-androst-4-en-3-one 17-acetate and 6β-chloro-6-fluoro-17β-hydroxy-9β,10α-androst-4-en-3-one 17-acetate.

Example 19

A mixture of 6α- and 6β-fluoro-17β-hydroxy-9β-10α-androst-4-en-3-one 17-acetate (19 g.) was enoletherified as described in Example 1. The 3-enolether obtained was dissolved in 660 ml. acetone at 0°. Subsequently were added to this solution a solution of 7.15 g. of sodium acetate in 71 ml. of water, 19.4 g. of N-bromosuccinimide and finally 71 ml. of acetic acid. Stirring was continued at 0.5° for 2½ hours. Work-up gave 23.9 g. of a residue, which was crystallized from ether to give 6.7 g. of 6β-bromo, 6-fluoro - 17β - hydroxy-9β,10α-androst-4-en-3-one 17-acetate with a melting point of 104–105° (dec.) ε(λ maximum=250 mμ)=8200. $[\alpha]_D^{25}=-168°$ (CHCl₃).

Chromatography of the mother-liquor through a column of 250 g. of silicagel afforded 1.62 g. of 6α-bromo,6-fluoro-17β-hydroxy-9β,10α-androst-4-en-3-one 17-acetate with a melting point of 113–116° (dec.) and ε(λ maximum=245 mμ)=11,650. $[\alpha]_D^{25}=+5°$ (CHCl₃).

Example 20

6α-chloro, 6-fluoro-17β-hydroxy-9β,10α-androst-4-en-3-one 17-acetate (100 mg.) in a solution of 33 mg. of lithium chloride in 13 ml. of dimethyl formamide was heated at 75° for 7 hours. Work-up gave in a yield of 85% the 6-fluoro-9β,10α-androsta-4,6-dien-3-one 17-acetate.

Example 21

6α-chloro-6-fluoro-17β-hydroxy-9β,10α-androst - 4 - en-3-one 17-acetate (600 mg.) was heated in 60 ml. of refluxing collidine for 7 hours. Work-up afforded in a yield of 77% the 6-fluoro-9β,10α-androsta-4,6-dien-3-one 17-acetate.

Example 22

According to Examples 20 and 21 were dehydro halogenated to 6-fluoro-9β,10α-androsta-4,6-dien - 3 - one 17-acetate the following compounds:

6β-chloro, 6-fluoro-17β-hydroxy-9β,10α-androst-4-en-3-one 17-acetate

6α-bromo, 6-fluoro-17β-hydroxy-9β,10α-androst-4-en-3-one 17-acetate

6β-bromo, 6-fluoro-17β-hydroxy-9β,10α-androst-4-en-3-one 17-acetate

6α-iodo, 6-fluoro-17β-hydroxy-9β,10α-androst-4-en-3-one 17-acetate

6β-iodo, 6-fluoro-17β-hydroxy-9β,10α-androst-4-en-3-one 17-acetate

Example 23

A mixture of 6α-fluoro- and 6-β-fluoro-17β-hydroxy-9β,10α-androst-4-en-3-one 17-acetate (1 g.) was enoletherified as described in Example 1.

After standing at room temperature for 20 hours, the reaction mixture was diluted with acetone at 0° and then halogenated with N-iodosuccinimide as described in Example 1 for N-bromo-succinimide. Work-up afforded 6-iodo, 6-fluoro-17β-hydroxy-9β,10α-androst-4-en-3-one 17-acetate. Dehydrohalogenation according to Example 20 afforded 650 mg. of 6 - fluoro - 17β - hydroxy - 9β,10α-androsta-4,6-dien-3-one 17-acetate.

Example 24

Injection liquids of 6,6-difluoro-17β-hydroxy-9β,10α-androst-4-en-3-one 17-acetate (active ingredient) were made as follows.

5.00 g. of the active ingredient were dissolved in 90 mls. of a solution of 2% w./v. benzylalcohol and 46% w./v. benzylbenzoate in ricinic oil at a temperature of 60° C. The solution was cooled to room temperature and replenished to 100 mls. with the ricinic oil solution aforesaid. The mixture was homogenised by stirring and filtrated. Ampoules and vials were filled with the filtrated solution, subsequently sealed and then sterilised by heating for one hour at 120°.

Example 25

2 g. of 6,6-difluoro-9β,10α-pregn-4-ene-3,20-dione were dissolved in chloroform, which solution was mixed homogeneously with 194 g. of lactose. The mixture was dried at 40° C. during 1 hour. The mixture was wetted with a 10% aqueous solution of 2 g. of gelatine and subsequently ground through a 20 mesh sieve. The mixture was dried at 40° C. during 24 hours, whereupon the granules were ground through a 20 mesh sieve. The mixture was weighed and then had added to it proportional amounts of talcum venetum and magnesium stearate in amounts of optimal 25 mg. and 2 mg. respectively. The resulting mixture was homogenised and worked to tablets of 225 mg. each.

We claim:

1. A steroid compound of the formula

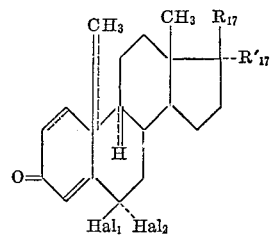

wherein the steroid nucleus has a configuration selected from the group consisting of the 9β, 10α steroids and the 9α, 10β steroids, carbon atoms 1 and 2 are joined by a single or double carbon to carbon bond, wherein $Hal_1$ and $Hal_2$ are each halogen atoms selected from the group consisting of bromine, chlorine and fluorine with the proviso that at least one of said atoms is other than fluorine, $R_{17}$ is selected from the group consisting of hydroxy, acyloxy of 1 to 20 carbon atoms, said acyloxy moiety being the acyloxy moiety of a carboxylic acid selected from the group consisting of saturated or unsaturated aliphatic carboxylic acids of 1–20 carbon atoms, benzoic acid, p-hexyloxy-phenylpropionic acid, hexahydrobenzoic acid, phenylacetic acid, β cyclopentylpropionic acid and β-cyclohexylpropionic acid, and etherified hydroxy of 1 to 10 carbon atoms and the

moiety, $R'_{17}$ is selected from the group consisting of hydrogen, hydroxy, acyloxy of 1 to 20 carbon atoms inclusive, said acyloxy moiety being the acyloxy moiety of a carboxylic acid selected from the group consisting of saturated or unsaturated aliphatic carboxylic acids of 1–20 carbon atoms, benzoic acid, p-hexyloxy-phenylpropionic acid, hexahydrobenzoic acid, phenylacetic acid, β cyclopentylpropionic acid and β-cyclohexylpropionic acid, and etherified hydroxy of 1 to 10 carbon atoms when $R_{17}$ is the

moiety and wherein $R'_{17}$ is selected from the group consisting of hydrogen and alkyl of 1 to 6 carbon atoms when $R_{17}$ is other than the

moiety.

2. A compound of claim 1 of the formula

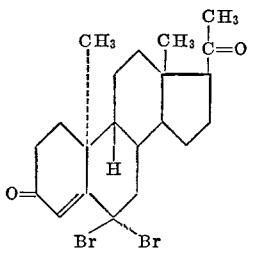

3. A compound of claim 1 of the formula

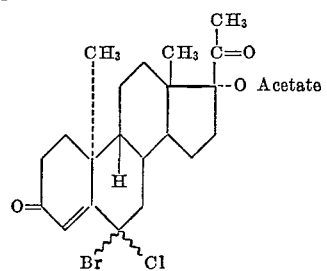

4. A compound of claim 1 of the formula

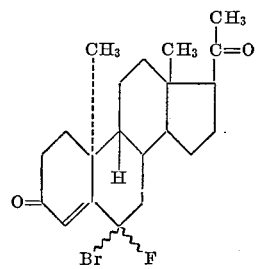

5. A compound of claim 1 of the formula

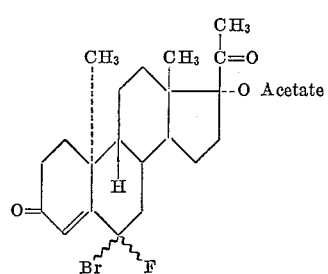

6. A compound of claim 1 of the formula

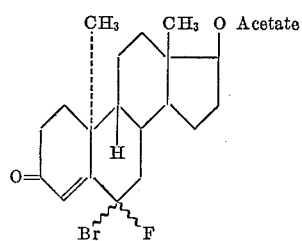

7. A compound of claim 1 of the formula

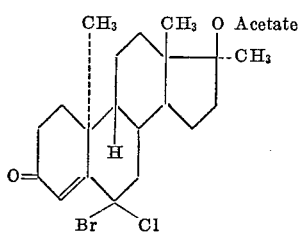

8. A compound of claim 1 of the formula

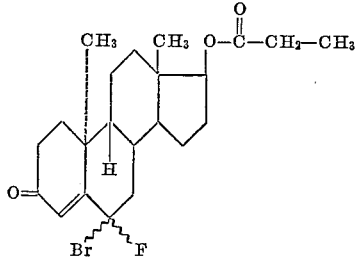

9. A compound of claim 1 of the formula

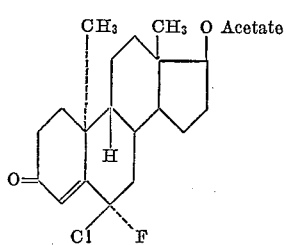

10. A compound of claim 1 of the formula
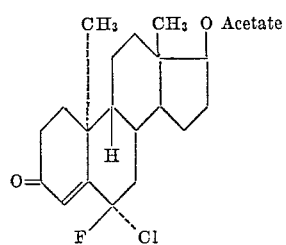
11. A compound of claim 1 of the formula
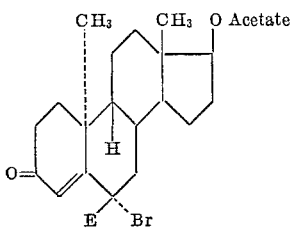
12. A compound of claim 1 of the formula
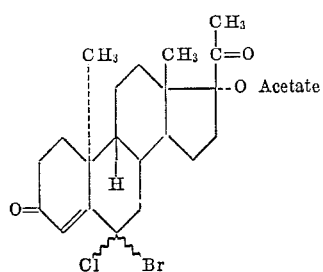
13. A compound of claim 1 of the formula
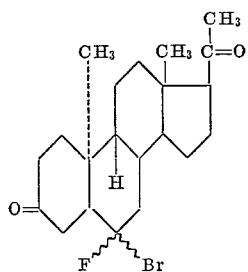
14. A compound of claim 1 of the formula
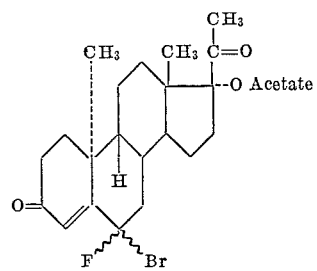
15. A compound of claim 1 of the formula
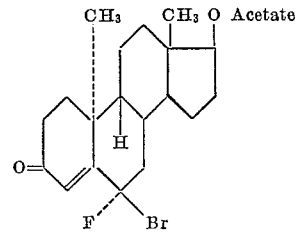
References Cited
UNITED STATES PATENTS
3,219,673  11/1965  Boswell _____ 260—397.3
LEWIS GOTTS, Primary Examiner
E. C. LOVE, Assistant Examiner
U.S. Cl. X.R.
260—239.5, 397.4, 397.5; 424—242, 243

UNITED STATES PATENT OFFICE
CERTIFICATE OF CORRECTION

Patent No. 3,468,917  Dated September 23, 1969

Inventor(s) PIETER WESTERHOF ET AL

It is certified that error appears in the above-identified patent and that said Letters Patent are hereby corrected as shown below:

Column 3, line 45, "4-6,6" should read -- 4,6 --.

Column 4, line 48, "1.8" should read -- 1.18 --.

Column 6, line 54, "10β" should read -- 10α --.

Column 9, line 23, "represent" should read -- represented --.

Column 12, claim 6, change the formula to read:

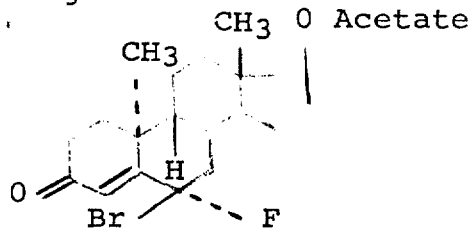

Column 12, claim 7, change the formula to read:

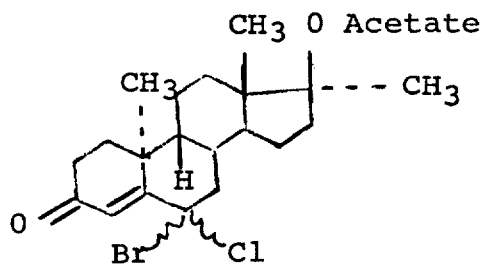

Column 14, claim 13, change the formula to read:

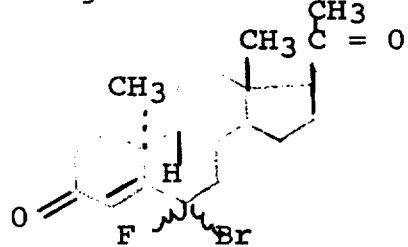

Signed and sealed this 7 day of July 1970.

(SEAL)
Attest:

EDWARD M. FLETCHER, JR.
Attesting Officer

WILLIAM E. SCHUYLER, JR.
Commissioner of Patents

PC 1050
(5/69)

UNITED STATES PATENT OFFICE
CERTIFICATE OF CORRECTION

Patent No. 3,468,919            Dated September 23, 1969

Inventor(s) John R. Kilsheimer and Ross A. Kremer

It is certified that error appears in the above-identified patent and that said Letters Patent are hereby corrected as shown below:

Column 4, line 64, the claim reference numeral "9" should read --6--.

SIGNED AND
SEALED
JUN 30 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,468,917          Dated    September 23, 1969

Inventor(s)    PIETER WESTERHOF ET AL

It is certified that error appears in the above-identified patent and that said Letters Patent are hereby corrected as shown below:

Column 3, line 45, "4-6,6" should read -- 4,6 --.

Column 4, line 48, "1.8" should read -- 1.18 --.

Column 6, line 54, "10β" should read -- 10α --.

Column 9, line 23, "represent" should read -- represented --.

Column 12, claim 6, change the formula to read:

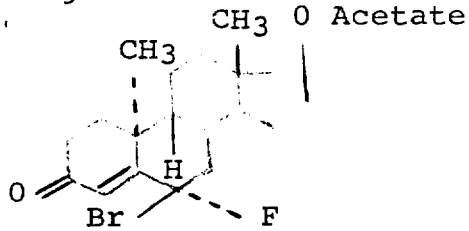

Column 12, claim 7, change the formula to read:

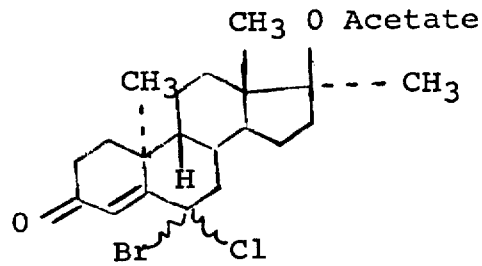

Column 14, claim 13, change the formula to read:

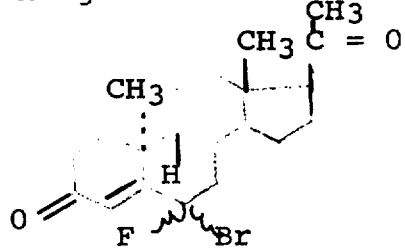

Signed and sealed this 7 day of July 1970.

(SEAL)
Attest:

EDWARD M. FLETCHER, JR.
Attesting Officer

WILLIAM E. SCHUYLER, JR.
Commissioner of Patents